United States Patent [19]
Takeuchi

[11] Patent Number: 5,346,273
[45] Date of Patent: Sep. 13, 1994

[54] WEATHER STRIP

[75] Inventor: Norio Takeuchi, Hiroshima, Japan

[73] Assignee: Nishikawa Rubber Co., Ltd., Hiroshima, Japan

[21] Appl. No.: 11,663

[22] Filed: Jan. 29, 1993

[30] Foreign Application Priority Data

Jan. 31, 1992 [JP] Japan .................................. 4-046315

[51] Int. Cl.$^5$ ............................................. B60J 10/08
[52] U.S. Cl. .................................. 296/146.9; 49/479.1; 49/484.1
[58] Field of Search ........................ 296/146 F, 146.9; 49/475.1, 479.1, 484.1, 495.1

[56] References Cited

U.S. PATENT DOCUMENTS 4,653,802  3/1987  Watanabe et al. ............ 296/146 F X Primary Examiner—David M. Mitchell
Assistant Examiner—Andrew C. Pike
Attorney, Agent, or Firm—Flynn, Thiel, Boutell & Tanis

[57] ABSTRACT

A weather strip is capable of obtaining a fine external appearance at the center pillar, of meeting need of flush surfacing, of obtaining better feeling when a door glass is open and closed, of obtaining strong closable force of a door and of preventing water leakage. The weather strip includes a main seal, a door cutline seal which has a lip gap seal protruding from the upper surface thereof and a run channel which elastically contacts the upper end edge of a door glass, wherein the main seal and the lip gap seal respectively elastically contact an opening edge of a body except an upper portion of a center pillar and wherein the main seal, the door cutline seal and the run channel are respectively attached to a door sash. The weather strip further including a hollow body side weather strip which is attached to the upper portion of the center pillar so as to elastically contact a rear end edge of the door glass.

5 Claims, 5 Drawing Sheets

WEATHER STRIP

BACKGROUND OF THE INVENTION

1. Field of the Invention

The present invention relates to a weather strip which seals a gap between an opening of a body and a door and is structured to serve as the weather strip to be fixed to both a door sash and the body.

2. Prior Art

There are conventionally two types of weather strip for sealing a gap between an opening edge 11 of a body 10 and a door 20, i.e., one is used in a sedan car (hereinafter referred to as sedan type) and the other is used in a hard top car (hereinafter referred to as a hard top type). The door 20 includes all movable portions with open and close operations, i.e., a door glass 21, door panels 22 and 23, pin catcher 24, door sash 30, run channel 40, main seal 50 and door cutline seal 60.

The sedan type is structured, as illustrated in FIGS. 1 to 4, in the manner that the weather strip is fixed to a door sash 30 and elastically contacts the opening edge 11 of the body 10 for sealing a gap between the body 10 and the door sash 30 and a door glass 21 elastically contacts it for sealing a gap between the door glass 21 and the door sash 30. The hard top type weather strip is structured, as illustrated in FIG. 1 and FIGS. 5 to 7 in the manner that the weather strips is fixed to the opening edge 11 and directly elastically contacts the door glass 21 for sealing a gap between the opening edge 11 and the door glass 21.

Explained more in detail, the sedan type weather strip comprises a run channel 40 to which the door glass 21 elastically contacts, a hollow main seal 50 which elastically contacts the opening edge 11 of the body 10 at the inner side thereof and a door cutline seal 60 which functions as a stopper of a displacement of the run channel 40 by means of the door glass 21 and has a lip gap seal 61 which is protrudes from the upper surface thereof for elastically contacting a front pillar 12 and a roof 13 of the opening edge 11 of the body 10 at the outer side thereof and a core 62 which is embedded therein.

The hard top type weather strip comprises a body side weather strip 70 which is attached to and extend over the front pillar 12, the roof 13 and the upper portion of the center pillar 14 of the opening 11 of the body 10 at the inner side thereof and elastically contacts the door glass 21 and a door side weather strip 80 which is attached to a lower inner surface of the door 20 and elastically contacts a lower portion 15 of the opening 11.

However, there is such problems in the sedan type weather strip that firstly, door panels 22 and 23 for covering the door sash 30 along the center pillar 14 remain irrespective of a panel door or an internal door, secondly, it is impossible to prevent the center pillar 14 from being seen from the gap between the door panels 22 and 23 which results in giving people the impression that the center pillar 14 is thick and thirdly, a decorative trim is additionally provided for giving people the impression that the center pillar 14 is black.

Whereupon, there are following problems in the hard top type weather strip although there is no problem regarding an outer appearance at the portion along the center pillar 14. Firstly, it is a disadvantage compared with the sedan type in respect of flush surface which occurs between the front pillar 12 and the roof 13 since the door glass 21 is roomed to room side to assure clearance necessary for opening and closing the door. Secondly, since the door glass 21 has small rigidity, which cause the door to be shaky and causes a driver malaise when the door is open and closed. Thirdly, it is difficult to increase the fitting accuracy of the door 20, which causes the shortage of closable force of the door and occurrence of water leakage, etc.

SUMMARY OF THE INVENTION

Accordingly, it is an object of the present invention to provide the weather strip capable of obtaining a fine external appearance at the center pillar, of obtaining better feeling when the door glass is open and closed, of obtaining strong closable force of the door and of preventing water leakage.

The weather strip according to the present invention comprises a hollow main seal 50, a door cutline seal 60 which has a lip gap seal 61 protruding from the upper surface thereof and a run channel 40 which elastically contacts the upper end edge of a door glass 21, wherein the hollow main seal 50 and the lip gap seal 61 respectively elastically contact an opening edge 11 of a body 10 except a center pillar 14 and wherein the hollow main seal 50, the door cutline seal 60 and the run channel 40 are respectively attached to a door sash 30, the weather strip further comprising a hollow body side weather strip which is attached to the upper portion of the center pillar 14 so as to elastically contact a rear end edge of the door glass 21.

DESCRIPTION OF THE PREFERRED EMBODIMENT

A weather strip according to a preferred embodiment will be described hereinafter.

Figure 1:
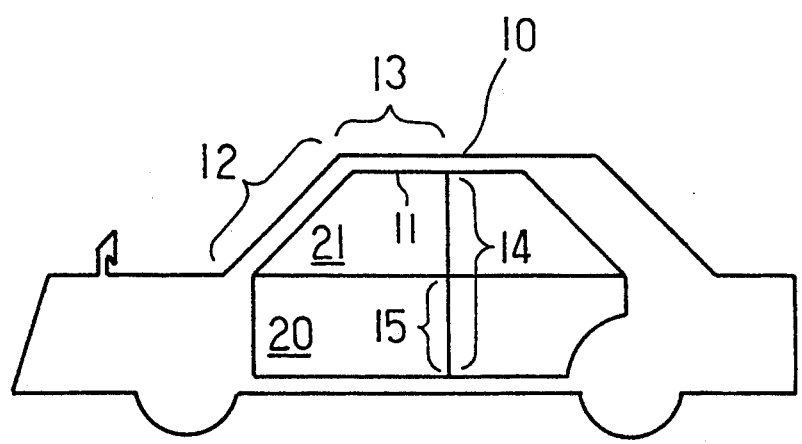
FIG. 1 is a side view of a car.
Figure 2:
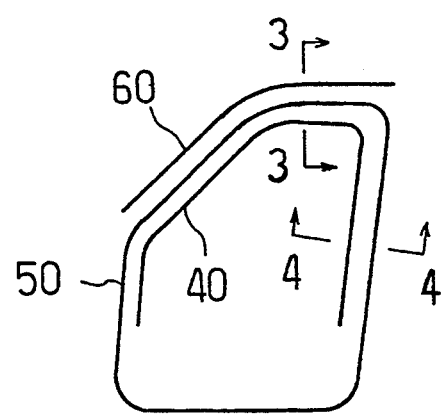
FIG. 2 is a front view showing the structure of a conventional sedan type weather strip.
Figure 3:
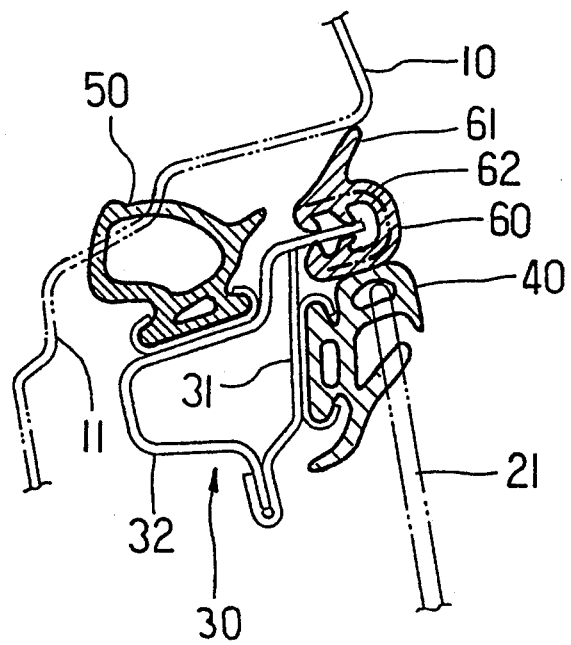
FIG. 3 is a cross-sectional view taken along 3—3 of FIG. 2.
Figure 4:
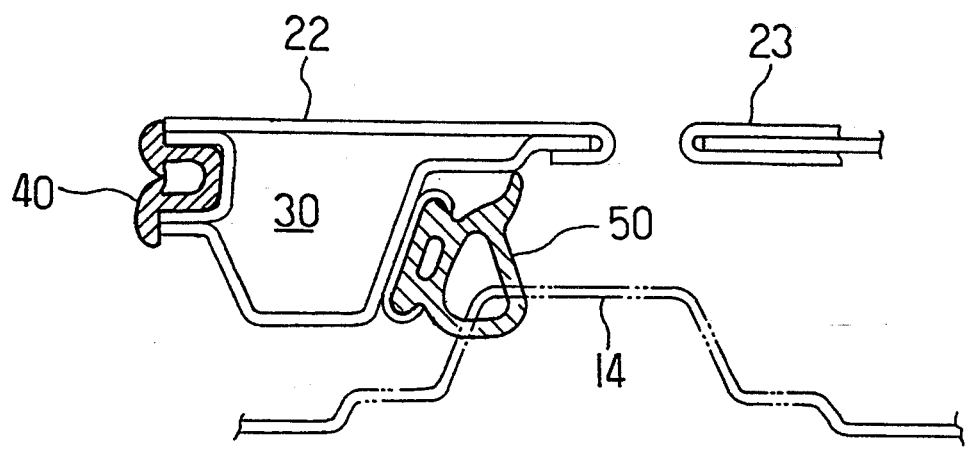
FIG. 4 is a cross-sectional view taken along 4—4 of FIG. 2.
Figure 5:
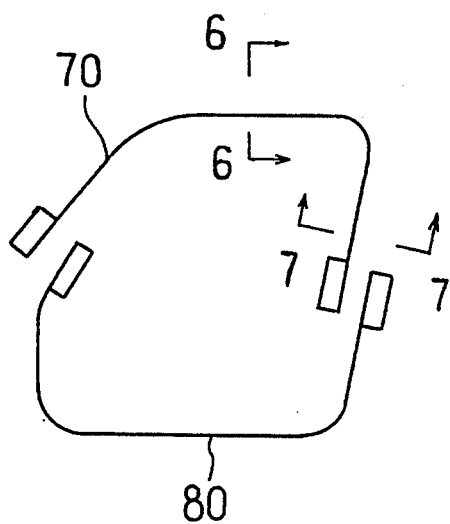
FIG. 5 is a front view showing the structure of a conventional hard top type weather strips.
Figure 6:
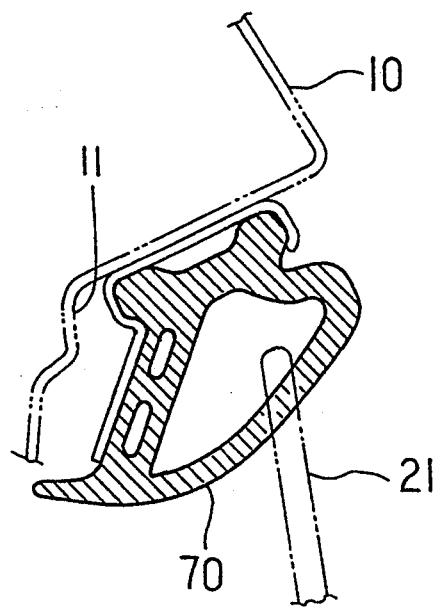
FIG. 6 is a cross-sectional view taken along 6—6 of FIG. 5.
Figure 7:
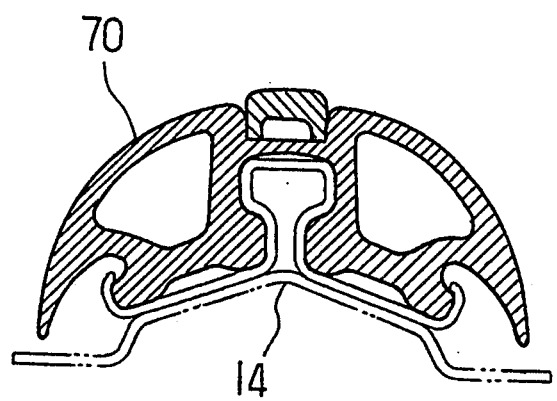
FIG. 7 is a cross-sectional view taken along 7—7 of FIG. 5.
Figure 8:
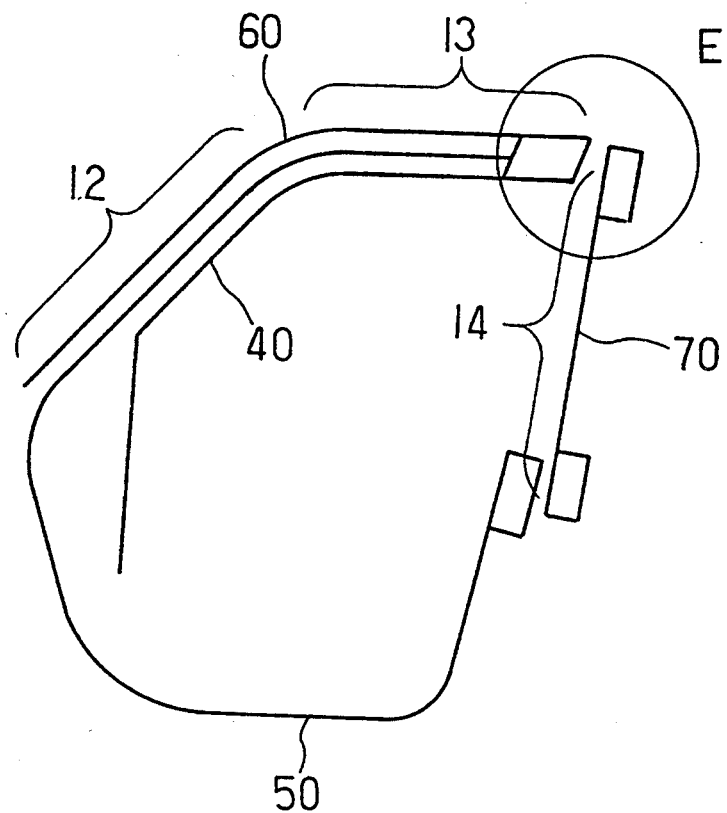
FIG. 8 is a front view showing a frame of a weather strip according to the present invention.
Figure 9:
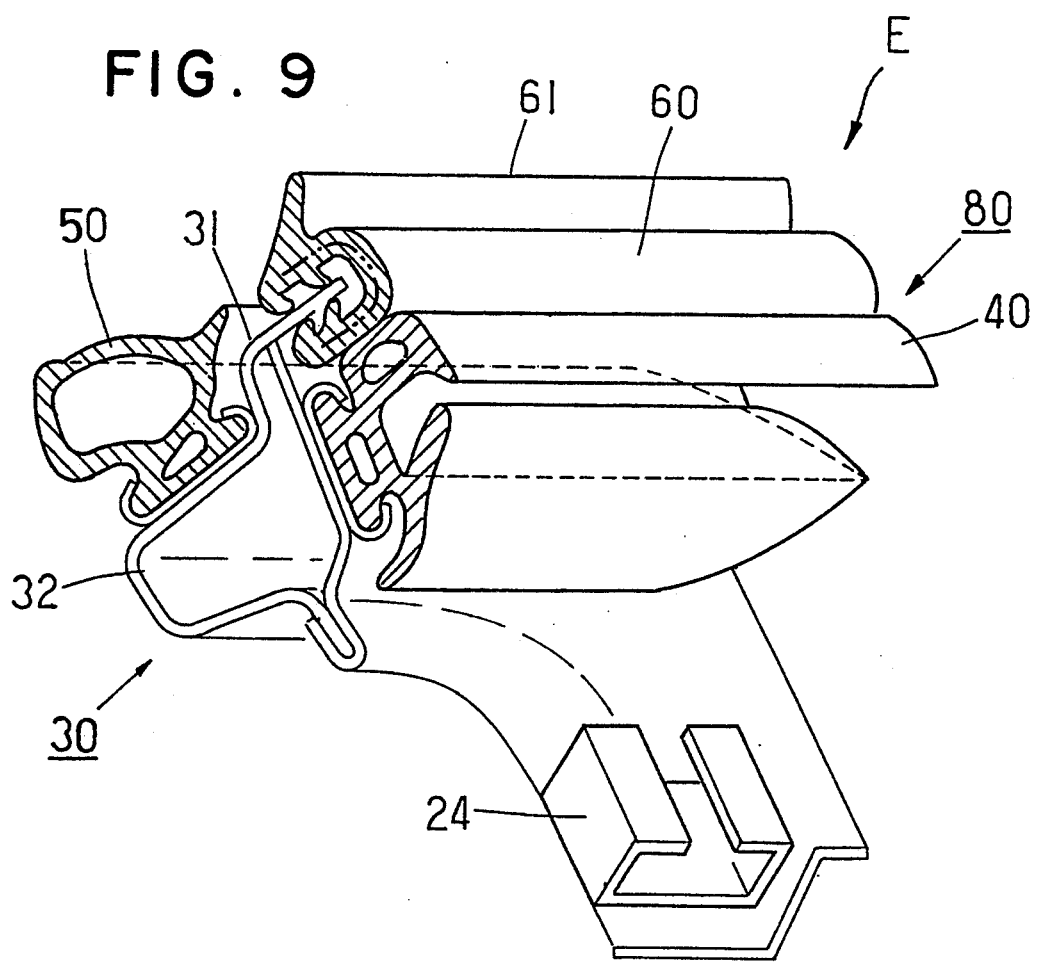
FIG. 9 is a perspective view of a door sash which is viewed from the front lower side of the inside of the car when a right door is open and which shows the portion denoted at E in FIG. 8 of a door side weather strip which is fixed to the door sash.
Figure 10:
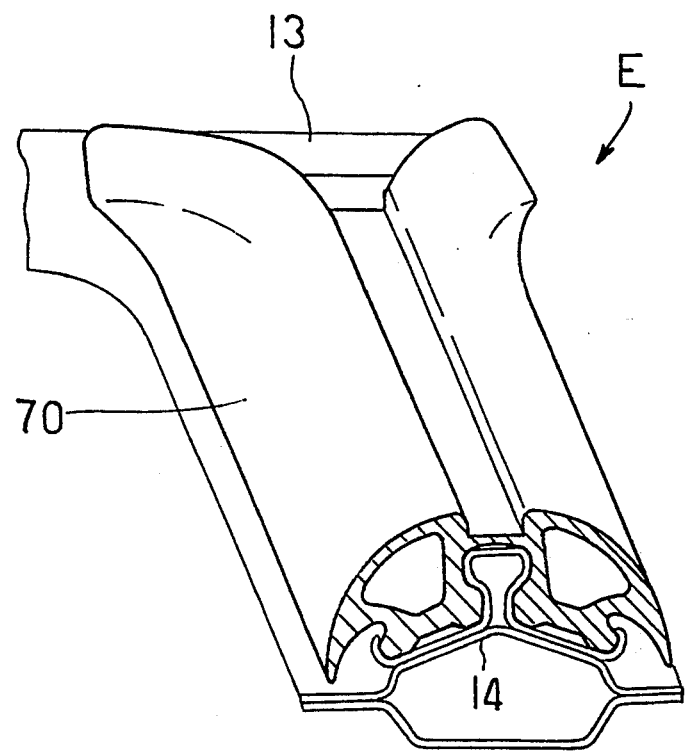
FIG. 10 is a perspective view of a center pillar which is viewed from the front lower side of the outside of the car when a left door is open and which shows the portion denoted at E in FIG. 8 of a body side weather strip which is fixed to the center pillar.

An inner door sash is explained first with reference to FIG 1. Denoted at 10 is a car body, 11 is an opening edge, 12 is a front pillar, 13 is a roof, 14 is a center pillar, 20 is a door and 21 is a door glass. With reference now to FIGS. 8–10, denoted at 30 is a door sash which is provided at the opening edge 11 in correspondence with the front pillar 12 and the roof 13 and the upper portion of the center pillar 14 and comprises a sash outer portion 31 which is open and directed toward the outside of the car and a sash inner protruding portion 32 which is disposed inside the sash outer portion 31 and protrudes toward the inside of the car and has a U-shape in cross section. Denoted at 40 is a run channel to which the door glass 21 elastically contacts and which is attached to the sash outer portion 31 and comprises a hollow portion and a lip. Denoted at 50 is a hollow main seal which is attached to the sash inner protruding portion 32 and elastically contacts the inner portion of the opening edge 11 except the upper portion of the the center pillar 14. Denoted at 60 is a door cutline seal which has a lip gap seal 61 protruded therefrom and contacting the front pillar 12 and the roof 13 and also has a core 62 embedded therein. The door cutline seal 60 is engaged with the upper portion of the sash outer portion 31 and functions as the stopper of the displacement of the run channel 40 by means of the door glass 21. The run channel 40, the hollow main seal 50 and the lip gap seal 61 constitute a door side weather strip 80. Both end portions of the run channel 40 and the hollow main seal 50 at the side of the center pillar 14 are gradually thinned toward the center pillar 14 and incorporated into the door cutline seal 60. Denoted at 70 is a body side weather strip which elastically contacts the rear end edge of the door glass 21 and attached to the upper portion of the center pillar 14. The upper end portion of the body side weather strip 70 is curved in an L-shape along the roof 13 and is thinned toward the tip end thereof and is laid on the lower portion of the end portion of the thinned hollow main seal 50. The door sash 30 is curved along the center pillar 14 at the upper end portion of the side of the center pillar 14 and has a pin catcher 24 at the end thereof for catching a pin head for the upper inner portion of the door glass 21 when the door glass is fully raised. That is, the hard top type weather strip is disposed at the upper portion of the center pillar 14 alone while the sedan type weather strip is disposed at the other portions.

Explained hereinafter is a function of the weather strip according to the present invention. Since the hard top type weather strip is disposed at the upper portion of the center pillar 14 and the sedan type weather strip is disposed at the other portions, the problem of the external appearance existing in the sedan type and the problem of the rigidity and the problem of the fitting accuracy of the door glass 21 existing in the hard top type are respectively solved. The run channel 40 at the side of the door, the hollow main seal 50 and the door cutline seal 60 respectively extend from the front pillar 12 to the roof 13 at the door side and are incorporated into one at the end portions thereof. Furthermore, these seals are continued to the body side weather strip 70 at the side of the body 10, when the door is closed whereby the problems of flush surface, door closing and water leakage are solved. This effect can be also achieved by a panel door type.

With the arrangement set forth above, the merits existing in both the sedan type and the hard top type are exhibited to thereby achieve the following effects. The external appearance of the center pillar 14 is improved. Flush surface can be achieved. The feeling when the driver opens or close the door glass 21 is improved and the fitting accuracy is improved, hence the force involved in closing the door is increased and water leakage is not likely to occur.

What is claimed is:

1. A weather strip comprising a main seal, a door cutline seal having a lip gap seal protruding from an upper surface thereof, and a run channel which elastically contacts an upper end edge of a door glass, wherein the main seal and the lip gap seal respectively elastically contact an opening edge of a body except an upper portion of a center pillar, and wherein the main seal, the door cutline seal and the run channel are respectively attached to a door sash, the weather strip further comprising a hollow body side weather strip attached to the upper portion of the center pillar to elastically contact a rear end edge of the door glass.

2. A weather-strip for sealing a gap between an opening of a car body and a car door, the opening having an opening edge defined by at least a front pillar, a roof and a center pillar of the car body, the car door including a door frame and a door glass, the weather-strip comprising:

a main seal attached to an inner protruding portion of the door frame which elastically contacts the opening edge except for an upper portion of the center pillar;

a run channel seal attached to an outer portion of the door frame which elastically contacts the door glass when the door glass is in a fully raised position;

a door cutline seal engaged to an upper portion of the door frame outer portion, the cutline seal stopping a displacement of the run channel seal when the door glass is in the fully raised position, an end portion of the run channel seal and an end portion of the main seal both gradually taper toward the center pillar and are incorporated into the door cutline seal; and a body-side weather strip attached to the upper portion of the center pillar which elastically contacts a rear end edge of the door glass.

3. A weather strip as claimed in claim 2, wherein an upper end portion of the body-side weather strip is curved along the roof and thins toward a tip end thereof, the tip end being positioned against a lower portion of the tapered end portion of the main seal when the car door is in a closed position.

4. The weather strip as claimed in claim 2, wherein the door cutline seal includes a lip gap seal protruding therefrom which contacts the front pillar and the roof.

5. The weather strip as claimed in claim 2, wherein the main seal, the run channel seal and the door cutline seal constitute a door-side weather strip.

* * * * *